Nov. 5, 1957
S. P. ANDERSON
2,811,913
AIR COOLER FOR AUTOMOBILE
Filed March 29, 1954
2 Sheets-Sheet 1
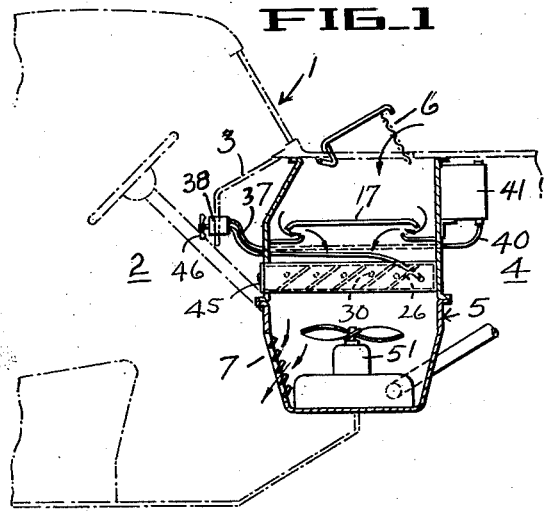
INVENTOR.
STEPHEN P. ANDERSON
BY
Boykin, Mohler & Wood
ATTORNEYS

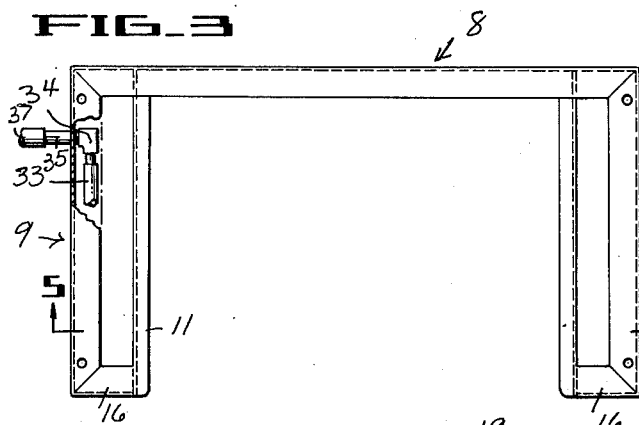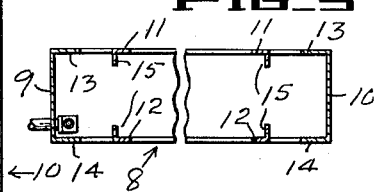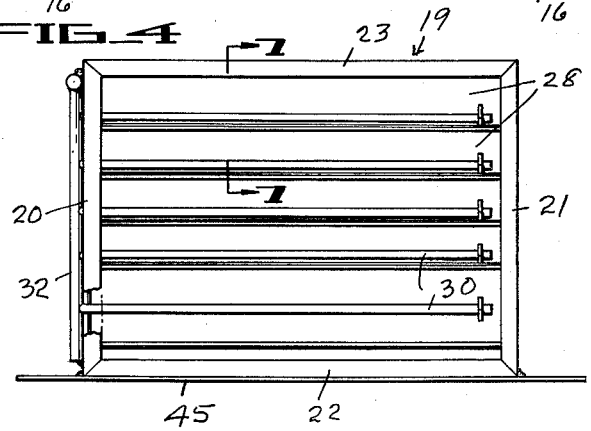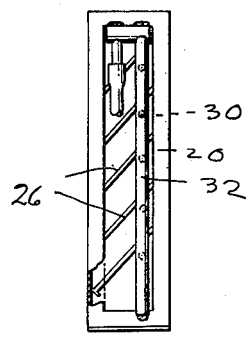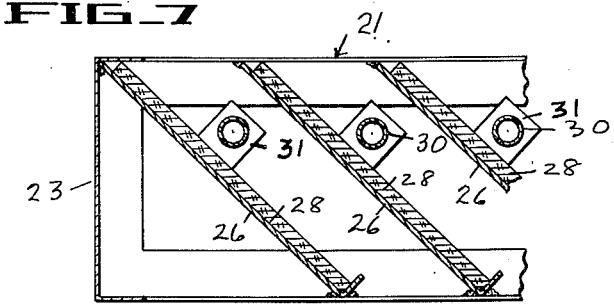

United States Patent Office 2,811,913
Patented Nov. 5, 1957

2,811,913

AIR COOLER FOR AUTOMOBILE

Stephen P. Anderson, San Francisco, Calif.

Application March 29, 1954, Serial No. 419,427

6 Claims. (Cl. 98—2)

This invention relates to an air cooling system, and more particularly to an air cooler and system adapted for use in an automobile.

One of the objects of the invention is the provision of a highly efficient, economically made, and simple means for conditioning the air in an automobile, and for cooling it, and which means is adapted to be readily incorporated into or installed in the air conduit now used in automobiles for bringing fresh air into the driving compartment.

During hot weather the conventional air supply system in an automobile offers no relief to the occupants of the passenger compartment for the rather obvious reason that the temperature of said air is unchanged, or, if anything, is higher inside the compartment than outside where the automobile is of the closed body type. Attempts to cool the air have been made, such as installing temporary and unsightly air conditioning devices in one or more windows. Attempts at installing refrigerating units have been made, but these are quite costly, both to install and to keep up, and to operate.

By the present invention the above objections are overcome, and the actual presence of the air cooling system is not apparent, since it is incorporated in the present system and is concealed.

Other objects and advantages will appear in the description and in the drawings.

In the drawings,

Fig. 1 is a view of one form of the present invention in a standard fresh air inlet conduit in an automobile, the walls of said conduit being in cross section.

Fig. 2 is a perspective view of the air conditioning and cooling unit.

Fig. 3 is a plan view of the frame that is adapted to removably support the louvers over which the air is adapted to pass.

Fig. 4 is a plan view of the louvers that are adapted to be held in the frame of Fig. 3.

Fig. 5 is a sectional view taken along line 5—5 of Fig. 3, broken in length to accommodate the view to the sheet.

Fig. 6 is an end view of the louvers of Fig. 4.

Fig. 7 is an enlarged, fragmentary sectional view of several of the louvers.

In detail, in Fig. 1 part of the automobile is generally indicated at 1 in dot-dash lines, in which the passenger compartment is at 2, the instrument board at 3 and the engine compartment at 4.

The air intake conduit is indicated at 5 and one end of said conduit opens outwardly into the outside air at 6, while the other end opens into the passenger compartment at 7.

There are different arrangements in different makes of automobiles, but all have the above described features in common and some have a baffle 17 extending across the conduit substantially as seen in Fig. 1. In some the conduit extends to the forward end of the hood and receives outside air at the grilled front of the automobile. The present invention is not intended to be restricted to any one type.

The air conditioning unit itself may comprise a generally U-shaped frame 8 (Fig. 3) the sides 9, 10 of which constitute the legs of the U and are substantially of channel structure with their open sides directed toward each other (Fig. 5).

Spaced inwardly toward each other from the channel sides 9, 10 are strips 11, 12 respectively substantially coplanar with the sides 13, 14 of each channel, and which strips have guide ribs 15 rigid therewith and extending toward each at right angles to said strips (Fig. 5). Thus a pair of coplanar ribs are along each of the channel sides 9, 10 of the frame 8 and spaced inwardly from said sides. End sections 16 secure one of the ends of said strips to the free ends of the channel sides 9, 10 while the opposite ends of said end strips connect with the upper and lower sides of the end section of the U-frame. This U-frame may be called the main frame of the air conditioning unit, and it is adapted to be secured by any suitable means to the walls of conduit 5.

A second sub, or auxiliary frame, generally designated 19 (Fig. 4) is provided, and which frame is preferably rectangular, having parallel opposed ends 20, 21 and parallel opposed sides 22, 23. Each of the ends and sides may each be formed of a pair of vertically spaced angle strips (Figs. 6, 7). Thus the center of the frame 19 is open.

Extending between ends 20, 21 and at right angles thereto are a plurality of parallel, spaced louvers 26 (Fig. 7) which louvers may be rigidly secured at their ends to said ends 20, 21 of frame 19.

These louvers 26 preferably are in echelon arrangement at about an angle of 45 degrees to the plane of the frame and each successive louver from one end of the row preferably overlaps the previous louver adjacent thereto for substantially half its width (Fig. 7) in a direction perpendicular to said plane of frame 19.

One of the corresponding sides of said louvers has a layer 28 of moisture absorbent, heat resistant material secured thereto and covering said side. This material is preferably a standard synthetic sponge-like material resistant to destruction from organisms that may be in water, as well as to heat and cold, but that readily absorbs and holds moisture.

Extending across the exposed face of each layer 28 is a pipe or tube 30 that is apertured so as to discharge water in each tube onto said material. These tubes 30 may be supported in brackets 31 at their ends (Fig. 7) that, in turn, are rigid with each louver. One of the corresponding ends of said pipes or tubes 30 are closed, while their opposite ends are connected with a header 32 (Fig. 4). One end of header 32 is connected by a flexible rubber or composition tube 33 (Fig. 2) that in turn may be connected to a fitting 34 carried by frame 8.

The fitting 34 has a nipple 35 that is connected with one end of a flexible hose or tube 37 and the other end of said hose connects with the discharge side of a valve 38. The inlet nipple 39 of said valve connects with one end of a flexible hose or tube 40, and the other end of said tube 40 connects with a water supply tank 41 (Fig. 1).

The subframe 19 is adapted to be slid into the open side of frame 8 and is supported between the sets of guides 15. A closure plate 45 (Fig. 4) on side 22 of the subframe extends over the sections 16 of the main frame 8 when the subframe is in said main frame, thus providing a pleasing and unobtrusive outside finish to the assembly. The hose or tube 33 may be readily disconnected to permit complete separation between the subframe and fitting 34 if and when desired.

By the above structure it is seen that the valve 38, which includes a manually actuatable handle 46 (Fig. 2) may be positioned at any suitable point remote from the air conditioning unit and the water tank according to the lengths of tubes 37, 40. This is quite important, since the valve 38 is preferably positioned within the compartment 2, so that the handle 46 is readily accessible to the operator for opening and closing the valve to permit water to flow from the tank 41 to the outlet pipes 30, and for controlling the rate of flow.

With the main frame 8 positioned within the conduit 5, the subframe is preferably positioned within said main frame so that the louvers extend across the path of travel of outside air through the conduit into the compartment 2. The layers 28 of absorbent material face oppositely to the direction of flow of said air, hence the air passes across said layers with a wiping action, causing evaporation of the water thereby cooling the air. At the same time this wiping action of the air over the wet sides of the louvers will remove dust and solids from the air so that clean cool air is delivered to the compartment 2.

The flow of water to the louvers can be accurately regulated so that maximum cooling efficiency is produced to cool the louvers and consequently the air passing between adjacent pairs of said louvers, without waste of water.

If and when the layers of moisture absorbent material may have collected sufficient dust and impurities to make their cleaning desirable, the subframe or lower unit can readily be removed and the layers 28 thoroughly flushed and cleaned and the unit replaced.

In Fig. 1 the valve 38 is secured to the instrument board. It may be secured to the fire wall or dividing wall between the compartments 2, 4, and is so positioned in some units, since the valve stem 50 may be of any desired length.

The fact that the material 28 is preferably heat resistant is because a heater for cold weather may be in the air duct, and the moisture absorbent material should not be injured by such heat. It is, of course, obvious that the present structure in which the louver unit is removable would permit such removal in cold weather, in which case a false subframe could be substituted, which false subframe would not have louvers or water supply means, but would carry a closure plate 45.

In the conduit 5, any suitable power fan 51 may be, and usually is provided, and the relationship between said fan and the cooling unit is preferably one in which the fan draws air over the louvers. Thus the fan is between the louvers and the open end 7 of the conduit.

The precise description of the elements and structure is not intended to be restrictive of the invention to the exact details of structure, since modifications of structure to suit certain conditions can be made within the scope of the invention.

It should be noted that the material 28 is odorless at any temperature subjected to in a standard automobile ventilating and heating system.

The tubes 30, as seen in Fig. 7, are spaced from the material 28, which is desirable since it allows for swelling of the material 28, when it is moistened without putting pressure on the tubes and without danger of closing the apertures in the tubes. These apertures may be offset to one side or the other of a plane bisecting each tube longitudinally thereof and disposed perpendicularly to the plane of the louver adjacent thereto to further reduce the likelihood of their being stopped up by the material 28 when the latter swells.

In some designs the tubes 30 may extend transversely across the louvers and material 28, instead of longitudinally thereof.

I claim:

1. An air cooling device adapted to be positioned in the fresh air intake conduit of an automobile comprising: a row of spaced, parallel imperforate louvers disposed in substantially echelon relationship whereby one of the sides of said louvers will face in the same direction but at an angle to the row, said sides of each louver being of moisture absorbent material, means for supplying moisture simultaneously to said sides, and means for securing said louvers in said conduit extending thereacross with said sides generally facing opposite to the direction of flow of air through said conduit into such automobile, said means for supplying moisture to said sides comprising an apertured pipe secured to each of said louvers rigid therewith for discharging water supplied thereto onto said sides, a container for said water, a conduit connecting said container with said pipes, and a valve in said last mentioned conduit, said last mentioned conduit being of flexible rubber-like material to facilitate positioning said valve at a point accessible for manipulation by the driver of such automobile.

2. An air cooling device adapted to be positioned in the fresh air intake conduit of an automobile comprising: a row of spaced, parallel imperforate louvers disposed in substantially echelon relationship whereby one of the sides of said louvers will face in the same direction but at an angle to the row, said sides of each louver being of moisture absorbent material, means for supplying moisture simultaneously to said sides, and means for securing said louvers in said conduit extending thereacross with said sides generally facing opposite to the direction of flow of air through said conduit into such automobile, said means for supplying moisture to said sides comprising a pipe secured to each of said louvers rigid therewith extending longitudinally of each louver, each of said pipes being apertured for discharging water therein onto each of said sides, a header connecting one of the ends of said pipes and their opposite ends being closed, a container for water, and a conduit connecting said last mentioned conduit with said header.

3. An air cooling device adapted to be positioned in the fresh air intake conduit of an automobile comprising: a row of spaced, parallel imperforate louvers disposed in substantially echelon relationship whereby one of the sides of said louvers will face in the same direction but at an angle to the row, said sides of each louver being of moisture absorbent material, means for supplying moisture simultaneously to said sides, and means for securing said louvers in said conduit extending thereacross with said sides generally facing opposite to the direction of flow of air through said conduit into such automobile, said means for supplying moisture to said sides comprising a pipe secured to each of said louvers rigid therewith extending longitudinally of each louver, each of said pipes being apertured for discharging water therein onto each of said sides, a header connecting one of the ends of said pipes and their opposite ends being closed, a container for water, and a conduit connecting said last mentioned conduit with said header, a valve, said last mentioned conduit comprising a first flexible tube connecting said container with said valve and a second flexible tube connecting said valve with said header whereby said valve and said container may be positioned in different positions as desired relative to said header.

4. In combination, in an automobile having a passenger compartment; an air intake conduit opening at one end outside said compartment of said automobile and opening at its other end inside said compartment for conducting outside air into said compartment, a frame in said conduit, a plurality of spaced imperforate louvers secured to said frame extending across said conduit, moisture absorbent material secured to one of the corresponding directed faces of said louvers, a frame supporting said louvers within said conduit with said material positioned to deflect air passing through said conduit into said compartment, means for supplying moisture to said material, and means for controlling the supply of moisture to said material, said means for supplying said moisture including a tank for water outside of said compartment, a conductor tube extending from said tank to said material, a valve in said tube and a control for said valve having a manually actuatable handle extending into said compartment accessible to the driver of said automobile.

5. In combination, in an automobile having a passenger compartment; an air intake conduit opening at one end outside said compartment of said automobile and opening at its other end inside said compartment for conducting outside air into said compartment, a frame in said conduit, a plurality of spaced imperforate louvers secured to said frame extending across said conduit, moisture absorbent material secured to one of the corresponding directed faces of said louvers, a frame supporting said louvers within said conduit with said material positioned to deflect air passing through said conduit into said compartment, means for supplying moisture to said material, a power actuated fan within said conduit for forceably moving fresh air from outside said compartment through said conduit and across said material and into said compartment.

6. In combination, in an automobile having a passenger compartment; an air intake conduit opening at one end outside said compartment of said automobile and opening at its other end inside said compartment for conducting outside air into said compartment, a frame in said conduit, a plurality of spaced imperforate louvers secured to said frame extending across said conduit, moisture absorbent material secured to one of the corresponding directed faces of said louvers, a frame supporting said louvers within said conduit with said material positioned to deflect air passing through said conduit into said compartment, means for supplying moisture to said material, a power actuated fan within said conduit for forceably moving fresh air from outside said compartment through said conduit and across said material and into said compartment, said fan being between said louvers and the end of the conduit that opens into said automobile.

References Cited in the file of this patent
UNITED STATES PATENTS

| | | |
|---|---|---|
| 432,837 | Renalds | July 22, 1890 |
| 1,521,575 | Wittemier | Dec. 30, 1924 |
| 1,949,522 | Williams | Mar. 6, 1934 |
| 2,097,425 | Wandell | Oct. 26, 1937 |
| 2,203,477 | Wahlberg | June 4, 1940 |
| 2,262,384 | Cooper | Nov. 11, 1941 |
| 2,285,725 | Kneedler | June 9, 1942 |
| 2,634,959 | Cave | Apr. 14, 1953 |
| 2,648,272 | Norton | Aug. 11, 1953 |